May 15, 1956
Y. PELENC
2,745,515
ACCUMULATOR FOR MECHANICAL ENERGY
Filed March 31, 1955
3 Sheets-Sheet 1
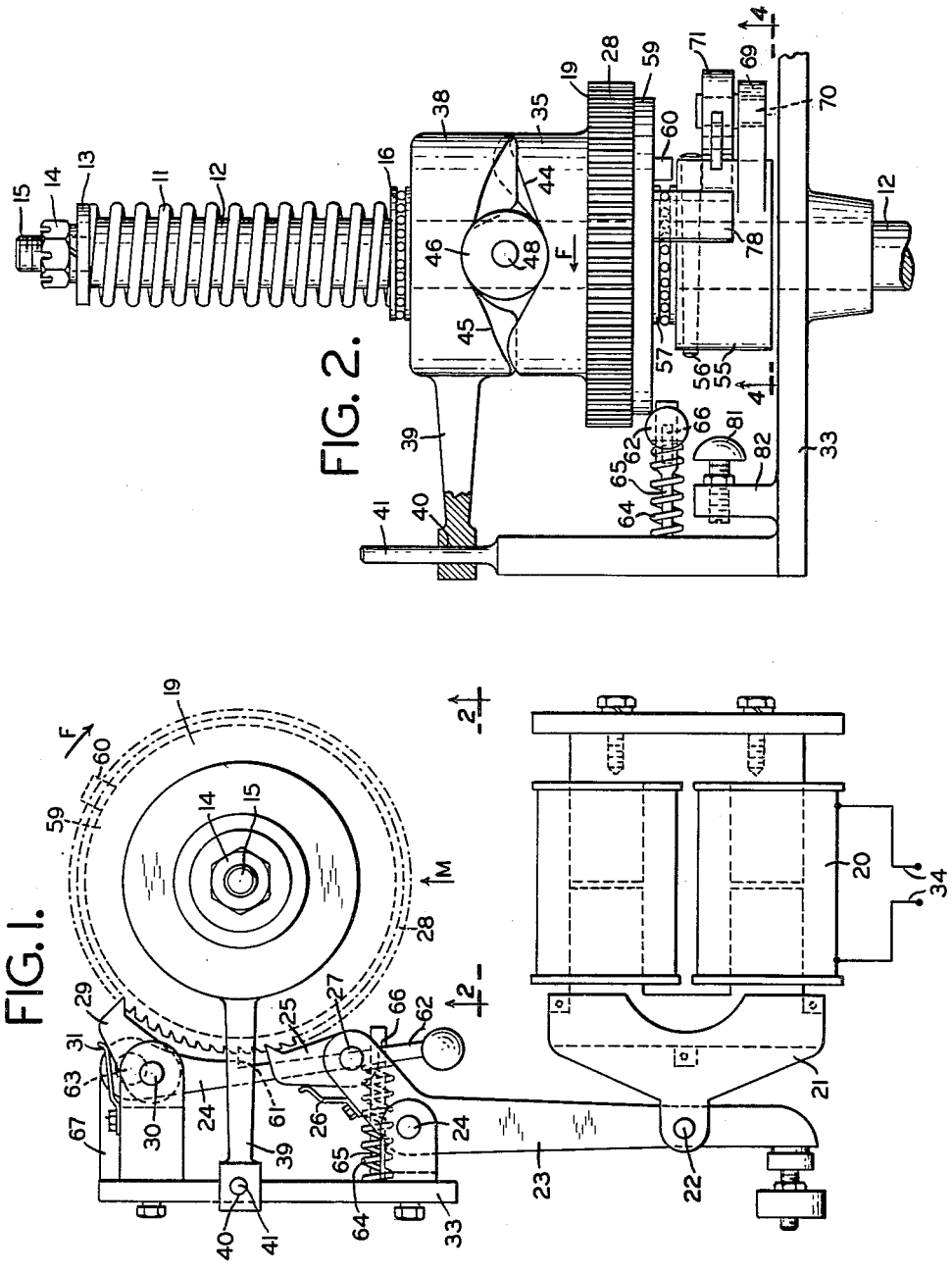
INVENTOR
YVES PELENC.
BY *Heinrich Rothschild*
ATTORNEY May 15, 1956     Y. PELENC     2,745,515
ACCUMULATOR FOR MECHANICAL ENERGY
Filed March 31, 1955     3 Sheets-Sheet 2

INVENTOR
YVES PELENC.
BY
ATTORNEY

May 15, 1956  Y. PELENC  2,745,515
ACCUMULATOR FOR MECHANICAL ENERGY
Filed March 31, 1955  3 Sheets-Sheet 3
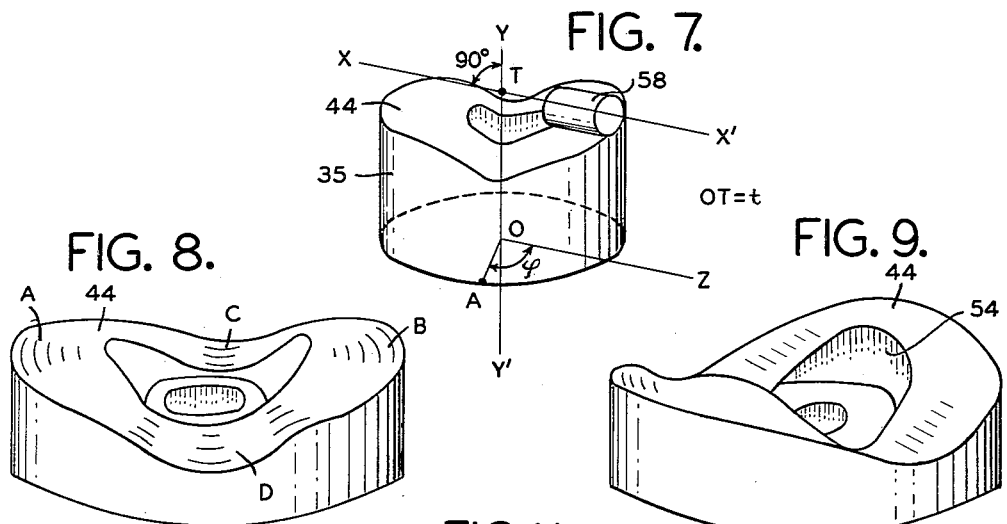
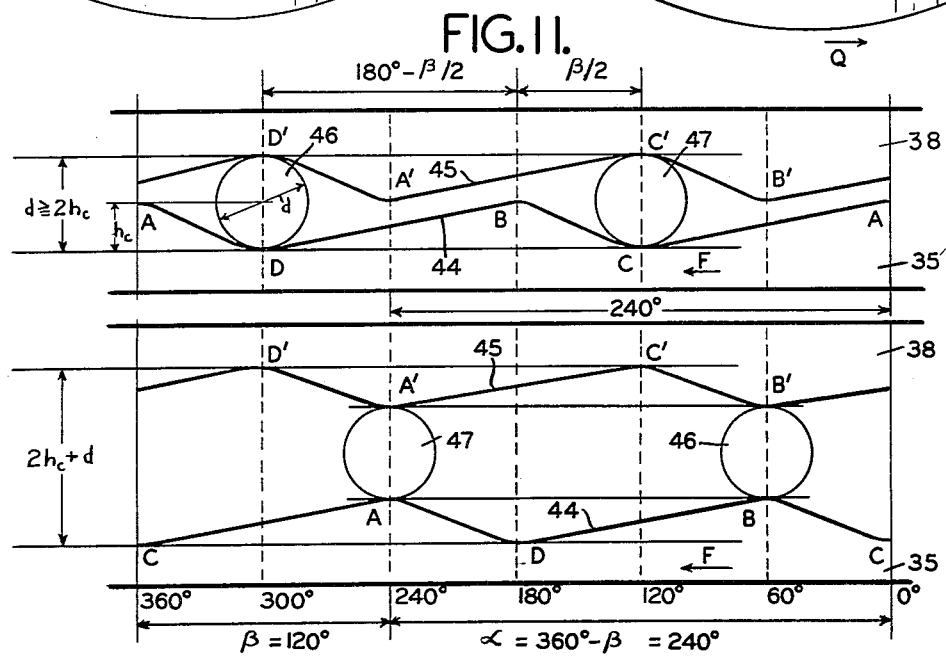
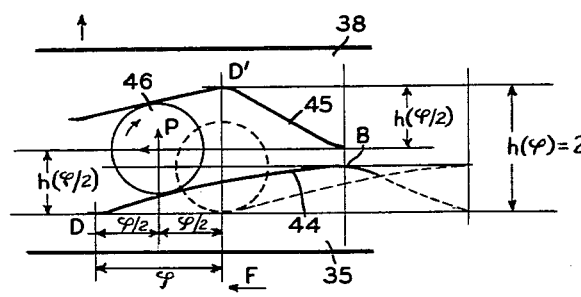
INVENTOR
YVES PELENC.
BY
ATTORNEY

United States Patent Office 2,745,515
Patented May 15, 1956

2,745,515

ACCUMULATOR FOR MECHANICAL ENERGY

Yves Pelenc, La Buisserate-St-Martin-le-Vinoux, France, assignor to Etablissements Merlin & Gerin, Societe Anonyme, Grenoble, France, a corporation of France Application March 31, 1955, Serial No. 498,397

Claims priority, application France April 7, 1954

14 Claims. (Cl. 185—37)

The invention refers to devices for the accumulation of mechanical energy in which the energy is accumulated by the tensioning of an elastic system, a spring or other elastic medium, and is released while generating a rotatory motion.

Such devices are useful for the actuation of circuit breakers, starters and controllers for motors and other rotary apparatus, and the like switching mechanism, particularly when it is desirable that the switching mechanism be actuated forcibly and in a short pre-determined period of time while, prior to but independent of the time of release, the energy for the actuation of the switching mechanism may be accumulated by a slow, continuous or discontinuous withdrawal of the energy from its source and the charging of the accumulator may be extended over a period of time of any desired duration.

More particularly, the object of the invention is an accumulator in which the accumulated energy when released produces the principal force substantially as an axial thrust while the radial pressure is rather negligible.

A further object of the invention is a device of the aforedescribed type in which the accumulator is charged through rotational motion of a rotary motor member, disc or hub, hereinafter shortly designated "rotor," a rotary member to which mechanical energy to be stored in the accumulator is supplied while, on release of the stored energy, rotational motion is imparted again to this rotary member or rotor to be transmitted therefrom to the apparatus to be actuated.

A still further object of the invention is the development of an accumulator for mechanical energy in which the energy storing and releasing elastic system, as hereinafter exemplified a coil or helical spring, is disposed for compression and expansion by translational motion along its longitudinal axis, while the energy is supplied to and discharged from this elastic system through rotational motion of the rotary motor member or rotor, both in the same sense of rotation about an axis which coincides with the longitudinal axis of the elastic system.

A further object of the invention is a particular motion transmitting and converting gear between rotor and elastic system of the energy accumulator. This motion transmitting and converting gear converts rotational motion of the rotor into translational motion of the elastic system or spring and conversely. At the same time this gear makes it possible to provide during the energy accumulating period or during the energy releasing period or both, for a turning moment of the rotor, which as a function of the angular or rotational path of the rotor is of a course of any desired character, such as of constant or substantially constant magnitude.

With these and other objects in view, the energy storing and releasing device of the invention includes an energy storing and releasing system disposed and arranged for compression and expansion by translational motion along a longitudinal axis thereof. Mechanism is associated with the elastic system for supplying mechanical energy thereto and for receiving mechanical energy released therefrom. This mechanism includes a rotor, carried by a shaft, and arranged, such that the geometric axis of rotation of the rotor coincides with the axis of the translatorial motion of the elastic system. The rotor is driven by a unidirectional drive and may thus be supplied with rotational energy to be transmitted to the elastic system or spring. Driven mechanism is associated with the rotor to which the energy released from the elastic system is supplied. Motion transmitting and converting gear connecting the rotor with the elastic system includes a slide member disposed axially displaceable but not rotatable upon the shaft and operatively connected with the elastic system. Between slide member and rotor there are disposed motion converting members for converting rotational motion of the rotor into translatorial motion of the slide member and thus of the elastic system for compressing the same and storing mechanical energy therein. Conversely, the motion converting members will serve, on release of the stored energy from the elastic system, to convert the translational motion of the elastic system during its expansion into rotational motion of the rotor; both rotational motions in the same sense of rotation.

In further development of the invention, the motion converting members comprise a pair of circular cam surfaces or cam ways disposed in opposition to each other upon said shaft, one cam way rigidly connected to the rotor, the other to the slide member. A cam roller is associated with the pair of cam ways and disposed for rolling therebetween while revolving about the axis of the system.

The cam ways are of a particular shape. If the intersection of a cam way with the outer cylinder face of the body carrying it is considered, this intersection presents a more or less sinuous form following the course of the generatrix which on its path generates the cam profile. In other words, the cam surfaces or profiles are each generated through movement of a rectilinear generatrix which intersects perpendicularly the longitudinal axis of the system and is moved along a circular directrix undulating, in the direction of the axis, as a curve between a maximum, or highest elevation, and a minimum, or deepest depression. The angular positions of the maxima and minima of the curves or cam profiles may be determined as a function of the intended angular deflections of the rotor during the energy storing and releasing periods, or also as a function of the intended lengths of time to be apportioned to the two periods, the energy storing period and the energy releasing period, a function which will also depend upon the characteristics of the elastic system, the relation between tension and longitudinal deflection of the spring.

The profile of the cam curve may be so calculated that, during the storing phase of operation, the turning moment exerted by the rotor upon the cam roller is generally constant and, the case given, conversely, during the release phase of operation, also the turning moment is generally constant which the cam roller exerts upon the rotor.

Further features and objects of my invention will become apparent as the now ensuing specific description of my invention proceeds in which the invention will be described with reference to the accompanying drawings which form part of this specification and which by way of example illustrate various embodiments of my invention.

These drawings, however, are to be understood explicative of my invention but not limitative of its scope. Other embodiments incorporating the principle underlying my invention are feasible without departing from the spirit and ambit of my appended claims.

In the drawings:

Fig. 1 is a longitudinal view of an energy accumulator of the invention together with an electromagnet and ratchet wheel and pawl as a unidirectional drive for tensioning in pulses the elastic system and charging the accumulator;

Fig. 2 is a transversal view along line 2—2 of Fig. 1, the electromagnet and the pawls having been omitted, the view however showing the mechanism of an embodiment for coupling the rotor of the device with the shaft carrying the rotor, as the driven mechanism, and further showing the means for disengaging the shaft from the rotor as well as the release mechanism for the ratchet wheel and pawl drive; the device being further shown with cam roller and cam ways as motion converting mechanism, both cam roller and cam ways being shown in the position where the elastic system is released;

Fig. 7 is a perspective view illustrating the generation of the cam profile through a milling or grinding process;

Fig. 8 is a perspective view of the rotary cam of Fig. 7 seen in the direction of the line of deepest depressions;

Fig. 9 is a similar view of the cam turned about 45° from the position of Fig. 8;

Fig. 10 illustrates schematically the displacement of a cam roller for an angle of rotation of 45° of the rotary cam from the released position of the elastic system, from the position of Fig. 2 where the deepest depressions or minima of the profile curves of the two cams are in opposition;

Fig. 11 illustrates the development into a plane of the cam profiles and their mutual position as well as the position of a pair of diametrally running cam rollers in the released phase of the elastic system;

Fig. 12 is a similar representation of the cam profiles and the roller pair in the charged phase of the elastic system.

Figure 3:
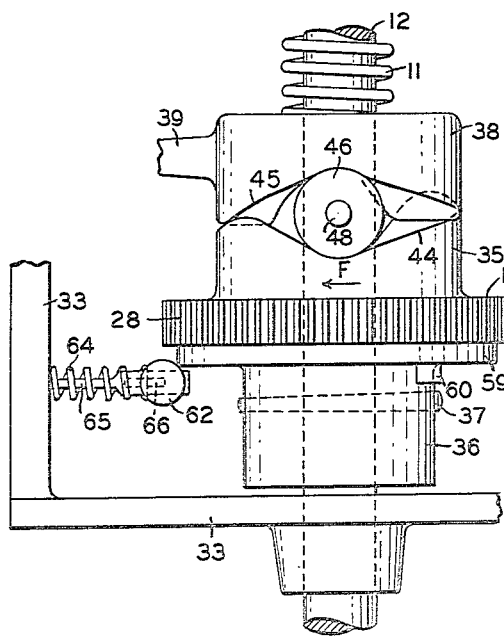
Fig. 3 is a similar view showing a modification of the arrangement of Fig. 2 wherein the rotor shaft is rigid with the rotor.

In the embodiment of Figs. 1, 2 and 4 to 6, the elastic system for storing and subsequently releasing mechanical energy is in form of a helical spring 11 carried on a shaft 12. On this shaft, when mechanical energy is supplied to the elastic system and subsequently mechanical energy is withdrawn therefrom, the spring may be compressed and may thereafter expand in translational motion along its longitudinal axis or the geometric axis of shaft 12. At its one end, spring 11 bears against a washer 13 and a nut 14 screwed to the head 15 of a shaft 12. The other end of spring 11 bears by means of a ball or roller bearing 16 against a slide member 38 of a transmission and motion converting gear which will hereinafter be described in detail and which serves for transmitting mechanical energy between a rotor 19 and the elastic system and converting rotary motion of the rotor into translatory motion of the elastic system and conversely.

In the embodiment of Fig. 1, the driving mechanism for driving the rotor 19 comprises an electromagnet generally designated by 20. The armature 21 of the electromagnet is articulated at 22 to a crank lever 23, pivotal about a pin 24 secured to the framework 33 of the device.

The crank lever 23 carries a driving pawl 25 pivotal about a pin 27 secured to crank lever 23. Pawl 25, under the action of a spring 26, engages the ratchet wheel or rim 28 integrally formed with or rigidly secured to the rotor 19. A holding pawl 29, pivotal about pin 30 mounted at the framework 33, is held by means of spring 31 in engagement with the ratchet wheel 28 and blocks any return movement of the ratchet wheel and thus of the rotor 19.

The electromagnet 20 is energized and controlled from a network 34 which under the control of a pulse generator or pulse controller supplies energy pulses to the electromagnet.

Further details of the electromagnet, such as the biasing spring of its core or plunger, stroke limiting or controlling means and others, the same as the means for supplying energy pulses to the electromagnet for the drive of the rotor, are not described here in further detail since they form no part of the invention. Likewise, the choice of the motor system which drives the rotor, preferably unidirectionally, forms no part of the invention. The motor drive as here exemplified by a ratchet gear might be replaced by any rotary motor, electric or hydraulic, or by manually operated command apparatus, the movement of which will then be transmitted to the rotor 19 through an appropriate motion transmitting mechanism, with or without speed reducer. Devices and control means may here be employed, such as they have been described in full detail and claimed in the co-pending U. S. Patent application Serial No. 480,951, filed by André Latour on January 10, 1955.

The motor drive which operates the rotor may thus be of the type which includes a step measuring gear by means of which the rotor is operated and thereby the spring tensioned in steps of constant definite length, such as by a ratchet gear, as exemplified here. The motor drive may also be of the type which does not produce or require actuating steps of a constant, definite length but may operate or advance the rotor in steps of indeterminate lengths such as by means of a free wheel and wedge-grip device as disclosed and described in the aforesaid patent application.

The mechanism will now be described which transmits to the spring 11 or other elastic system the rotational energy supplied to the rotor and which converts the rotational motion of the rotor into translatorial motion of the elastic system, and which, conversely when subsequently the stored energy is to be released, drives, by means of the rotor, any mechanism for the actuation of a switching mechanism connected thereto and to be actuated thereby.

The rotor 19 with its ratchet wheel 28 is integrally formed with or rigidly secured to a hub 35 and with the same idly mounted on shaft 12 as in the embodiments illustrated in Figs. 1, 2, 4 to 12, or as in the embodiment of Fig. 3, is provided with a hub 36 rigidly secured to shaft 12 by means of a pin or split pin 37.

The motion transmitting mechanism further comprises the slide member 38 against which spring 11 bears. This slide member is loosely displaceable on shaft 12 but is prevented from rotation by means of a tail 39 rigid therewith and slidably arranged by means of an eye 40 on a pin 41 projecting from the framework 33.

The motion converting mechanism comprises a pair of circular cam ways 44, 45 and rotatable cam rollers 46, 47 revolving therebetween. The circular cam ways are arranged in opposition to each other, one cam way, 44, upon the free end face of the rotor hub 35, the other cam way 45, upon the free end face of the slide member 38.

Figure 5:
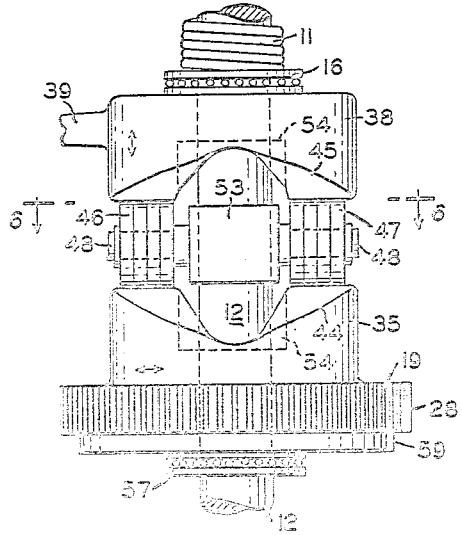
Fig. 5 is a partial view of the embodiment of Figs. 2 and 4 showing the cam and roller device in the tensioned position of the elastic system.
Figure 6:
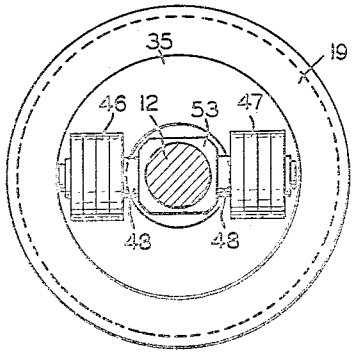
Fig. 6 is a section along line 6—6 of Fig. 5.

The rollers 46, 47 are rotatably mounted upon the half or stub axies 48, rigidly secured to or of one piece with a sleeve 53 slidably and rotatably mounted on shaft 12, as Figs. 5 and 6 illustrate. The bodies carrying the cams are provided with recesses 54 into which, when the spring 11 expands, sleeve 53 may enter.

The rollers 46, 47 are multiple rollers, each composed of two or more discs, in the embodiment illustrated four, for taking into account the varying peripheral velocity which increases with the radius from the inner circumference of the cam way to its outer circumference.

Cam 44 with hub 35 and rotor 19 in the embodiment of Fig. 3 is axially held in position on shaft 12, by being keyed with its hub 36 and by means of a cotter pin or split pin 37 to shaft 12. In the embodiment of Figs. 1, 2, 4 to 12, where rotor 19 is rotatable about shaft 12, the rotor under the pressure of spring 11, through the cam and roller system, is pressed and axially held against a sleeve 55 secured by means of a pin 56 to shaft 12, a ball or roller bearing 57 being provided between rotor 19 and sleeve 55.

Cam 44 may however rotate, either, as in the case of Fig. 3, with shaft 12 or, as in the case of the other figures, idly on shaft 12; cam 44 being driven from the motor drive, ratchet gear 25, 28, or other motor means, when energy is supplied to the system to be accumulated therein or, when energy is released from the system, driving shaft 12, positively or operatively connected therewith for operating thereby the switching mechanism to be actuated.

Cam 45 with the slide member 38 carrying it is slidable upon shaft 12 and is pressed under the action of spring 11 against the cam rollers 46, 47.

In order that these cam rollers may roll without sliding upon both cam ways, the profiles of both cam ways, when the body carrying the one is imagined to be turned over so that both cam surfaces face the same direction, are identically shaped.

Relatively to the rollers, the cams are disposed in the system antisymmetrically, that is, when the body carrying the one cam is imagined to be turned 180° about the axis of a roller, both cam surfaces coincide in any position of the roller, so that both cam surfaces, in any working position of the bodies carrying them, contact the roller tangentially and diametrally of the roller circumference and with the contacting surface elements of the cam surfaces parallel to each other.

In order to distribute the pressure equally over the discs which compose the rollers, the cam profile may be produced, as Fig. 7 illustrates, by means of a milling or grinding cylinder 58, of the same diameter as the rollers or their discs. The geometric axis XX' of this cylinder, the same as the axis of the roller, is so directed that it intersects perpendicularly the geometric axis YY' of the cam, at T in the position of Fig. 7. The milling or, mathematically spoken, the generating cylinder will be guided relatively to the cam along an undulated path, conformable to the intended cam profile, so that the generating cylinder executes the same movement which the cam rollers are intended to execute during their normal operation. Otherwise formulated: the cam way or the cam profile is produced through movement of a rectilinear generatrix intersecting perpendicularly the axis of the cam and moved along a circular directrix. This circular directrix undulates in the direction of the axis as a curve between a maximum, highest elevation, and a minimum, deepest depression.

It will readily be seen by comparison of Fig. 2 to Fig. 5, that, when the rollers are at the minima of the cam profile curves, Figs. 2 and 11, the spring is tensioned to the minimum, whereas when the rollers are at the maxima of the cam profile curves, Figs. 5 and 12, the cams are in the position of greatest distance from each other and the spring is tensioned or compressed to its maximum.

Referring again to Fig. 7, let us assume that the cam body 35 rotates about the axis YY' without displacing itself longitudinally, the center O of its base thus remains fixed on axis YY'. Let us further define the angular position of cam 44 as the angle $\varphi$ which a radius OA describes with a fixed axis OZ extending from O perpendicularly of YY'.

Let us further assume that, while the cam may rotate about axis YY', the axis XX' of the roller be prevented from revolving about YY'. The axis XX' of the generating cylinder is then forced to displace itself in the plane YOZ, remaining constantly perpendicular to the axis YY', and intersecting the same. The distance between the momentary point T of intersection and an arbitrarily chosen origin O on axis YY', for instance the center of the base, or the variable height of the axis XX' above the base be designated by $t$.

The movement of the generating cylinder 58 or of a roller 46 relatively to the cam 44 may thus be completely determined when the ordinates $t$ corresponding to the various angular positions $\alpha$ of cam 44 are known. The amplitude of the axial deflection of the generating cylinder or of a roller will thus be a function, appropriately chosen, of the angle of its position $\varphi$ at the cam, and may thus be connected with this angle by the equation $t = f(\varphi)$.

This function will be determined, on the one hand, by the law in accordance with which, during the storing period, the work or energy for tensioning or compressing the elastic medium is to be supplied to the elastic system; in other terms, by the law following which the couple or turning moment which resists the charging of the elastic system, is intended or desired to vary. On the other hand, for the energy releasing period, this function will be determined by the law in accordance with which it is desired or intended to release the accumulated energy, that means, the law in accordance with which the driving moment exerted on the rotor is to vary.

Thus, for instance, the axial displacement of the roller as a function of angular displacement may be chosen such that during the energy storing period or phase as well as during the energy releasing period or phase, the couple or turning moment exerted upon or by the rotor remains substantially constant.

The cam profile may further be so designed that for a full revolution of cam 44 a single cycle of energy storing and releasing is realized. Under this condition and for an arrangement of cams and rollers as illustrated in Fig. 2, and since two diametrally disposed rollers or sets of roller discs are employed, the profile curve of the cam comprises two maxima or highest elevations A, B and A', B', and two minima or deepest depressions C, D, and C', D', Figs. 7 to 12. The number of maxima and also the number of minima will correspond to the number of rollers or disc sets, or will be multiple thereof should one full revolution of cam 44 correspond to a multiple of cycles instead of only one cycle.

In the embodiment illustrated, the arc or angular distance between two maxima is 180° or in radians $2\pi$ and likewise between two minima and, more generally, between two corresponding points of the same cam, the cam surface thus presenting on its whole circumference two identical profiles upon each of which a roller or set of roller discs bears.

On the other hand, the angular distance or arc between a maximum and the succeeding minimum corresponds to the proportion of the energy releasing period to the whole cycle and will be adapted to the angle the rotor describes when driven by the released energy. Evidently, the same principle may be followed, for the generation of a cam profile which for a full revolution of cam 44 or of the rotor comprises several energy accumulating and releasing periods.

Fig. 7 illustrates the production of a cam profile through coordinated rotation of the generating cylinder 58 about its axis XX', its revolution about axis YY', and displacement of its axis XX' with its intersection point T along axis YY'. Fig. 8 shows a cam in perspective, seen in the direction of the line which connects the minima or the points of the deepest depressions. Fig. 9 shows in perspective the same cam turned about 45° in the sense of arrow Q.

Figs. 10 to 12 show the development, into the plane of the drawing, of the cam profiles in various mutual positions of the cams.

Since the cam surfaces are generated by generatrices which are perpendicular to the axis of the cams, the projections of the cam surfaces upon the plane of the drawing or their images are curves ACBD and A'D'B'C' which at the same time are the traces of the generatrices or represent the images of the directrices along which the generatrices are moved.

The lower cam 44, as has been described hereinabove, may rotate about its axis but may not be displaced along this axis, whereas, contrariwise, the upper cam 45 may slide on shaft 12 but may not rotate about it.

The rollers 46, 47 when spring 11 is fully released, are respectively located between the minima or lowest points D, D' and C, C' of the cam profiles, Fig. 11.

If $h_c$ is the distance between the two tangential planes of the maximum and the minimum of the profile curve, the diameter $d$ of the rollers is so determined that in any position which the cams may occupy relatively to each other, the surfaces of the cams may never come into direct contact. This condition is certainly satisfied when the diameter $d$ of the rollers is greater or even only slightly greater than $2\ h_c$, the axial distance between the opposite minima of the two cam profiles thus being greater or slightly greater to equal $2\ h_c$ or $\geqq 2\ h_c$.

Let us assume that the cam 44 starts to rotate from the position of Fig. 11 as zero position. Hub 35 with cam 44 moves to the left, in the sense of arrow F, see Fig. 10. The rotating cam tends to move the rollers 46 in the same direction. Roller 46, the same as roller 47, is held between the cams 44 and 45 and the pressure forces exerted on the roller are always diametrally opposed, since, as described above, the cam profiles are identical and the cams are in antisymmetric position relatively to the rollers.

The rollers thus have no tendency to slide relatively to the one or the other cam and may only roll thereupon.

The conditions thus are those of a roller held between two parallel surfaces, of which one is fixed whereas the other is displaced and draws the roller along. In view of the laws of kinematics, the displacement of the center of the roller will thus be half of the corresponding displacement of the moving surface. Thus, in order to obtain an angular displacement of the roller 46, or 47, of a certain magnitude, say $\varphi/2$, the cam 44 must execute an angular displacement of double the magnitude, thus $\varphi$, Fig. 10.

If the distance, in the axial direction, between the center of the roller in the position of Fig. 11 and the tangential planes through the minima (horizontal in the drawing) is each $h(\varphi/2)$, the distance between the two tangential planes will be $h(\varphi)=2h(\varphi/2)$. The roller, and the upper cam, will thus have been lifted $2h(\varphi/2)-d$ in the axial direction.

Under the supposition that the tensioning of the spring and the release of the accumulated energy be obtained by a complete revolution of cam 44 and the angle of release be $\beta$, the tensioning angle will be $\alpha=360°-\beta$ and the angular distance DB between a minimum and the succeeding maximum will be $180°-\beta/2$, corresponding to the tensioning period. In order to simplify the representation in Figs. 11 and 12, the angle of revolution of the rotor system to be driven through the release period of the spring is assumed to be 120°. The angle of revolution of the rotor for tensioning the spring will thus be 240°. During the tensioning or energy accumulating period, cam 44 will thus rotate an angle of 240° in the sense of arrow F, the rollers will revolve an angle of 120°; whereas during the release period, these angles will respectively be 120° and 60°.

This is illustrated in Figs. 11 and 12. Starting from the position of Fig. 11, maximum A moving in the direction of arrow F (corresponding to the arrow F of Fig. 2), will describe an angle of 240° to reach the position of Fig. 12. In the course of this movement, roller 47 ascends the tensioning rise from C to A on cam 44 and from C' to A' on cam 45 while describing an angle of 120°. The roller 47 will then have reached the position shown on Fig. 12. During this movement, cam 45 with slide member 38 has been pushed back, against the tension of spring 11, a distance of $2\ h_c$, the spring thus being compressed for a length of $2\ h_c$ and fully tensioned. The tensioning period at this instant is terminated.

When subsequently the spring will be released, cam 47 will push back roller 47 along the fall or slope A'D' of the cam, the roller will be displaced and revolve by 60° and, while bearing upon the fall AD, will rotate the cam 44 by 120°, always in the sense of arrow F.

Spring 11 expands and the whole device returns into the position of Fig. 11. The rollers have executed half a revolution while cam 44 executed a complete revolution. Roller 46 has now substituted roller 47 and vice-versa.

These movements have been explained with reference to roller 47. Of course both rollers, since they are symmetrically mounted at both sides of sleeve 53 will always execute identical movements. Practically, the parts will be so arranged that the rollers at the end of the storing period will be moved slightly beyond the maxima in order to avoid that the device be stopped at the dead point where at the setting in of the release movement no starting moment would be available.

The cam rises and the cam falls, as will be readily understood, may easily be so calculated or determined by experiment that any desired dependency may be established between the momentary axial force or thrust exerted by the spring or upon the spring and the turning moment exerted upon or by the rotor.

The characteristics of the elastic system, i. e. the relation between thrust and amplitude of expansion and compression, on the one hand, and the desired course of the magnitude of the moment—for instance constant—during each period of operation, on the other hand, are known. Moreover, in any position the tangential length elements of the slidable cam and of the rotatable cam which contact the roller are diametrally opposite each other and parallel. Axial forces or thrusts exerted from the elastic system or exerted upon the same and peripheral forces which the rotor exerts when it is driven and is tensioning the spring or to which the rotor is subjected, when the spring is released, thus are connected by a relation which is a function of the characteristics of the spring and of the tangens of the angle under which the respective length element is inclined. Thus through proper choice of the gradients along the cam profiles between consecutive maximum and minimum for the energy releasing period, and between consecutive minimum and maximum for the energy accumulating period, the desired functional relation may be readily determined.

In order to stop and block the movement of the rotor 19 at the termination of the energy accumulating period and to release the rotor when the energy is to be released, the rotor is provided with a stop member, finger 60 projecting from a plate 59, of one piece with or rigidly secured to the rotor. The finger 60, in the position of the rotor where the rotor has completed its spring tensioning course, engages a releasable abutment member in form of a nose 61 upon a stop and release lever 62 pivoted at 63 to a bracket 67 secured to the framework 33. Lever 62 is urged towards the rotor by means of a spring 64 carried upon a stem 65 likewise secured to the framework. Stem 65 is provided with a guide slot 66 through which stop and release lever 62 is extended and which limits its deflection in both directions.

Starting from the released position, Figs. 2 or 3, the apparatus insofar as described operates as follows:

The rollers 46, 47 are at the deepest points or the minima D, D' and C, C' of the cam profiles 44, 45, position Fig. 11. The electromagnet 20, 21 or other driving motor will now be energized in pulses by means which here, since not forming part of the invention, are not described but have been explicitly described in the aforenamed U. S. Patent application Serial No. 480,951. The rotor 19 will be rotated step by step in the sense of arrow F, Figs. 2, 3 and 4, and the rollers, as has been described with reference to Figs. 10 to 12, will push the slide member 38 back and will thus compress and tension the spring 11.

As soon as the rollers 46, 47, have arrived at the highest points or maxima B, B' and A, A' of the cam profiles, position Fig. 12, spring 11 is tensioned to the maximum. If cam 44 is allowed to rotate further, slightly, in the sense of arrow F, spring 11 while expanding tends to cause further rotation, in the same sense, of cam 44. After a short idle course along stop and release lever 62, finger 60 will engage the nose 61 of lever 62 and further rotation of cam 44 will thus be prevented. The energy supply to the electromagnet will now be cut off, by means of proper limit switches or means as described in the said patent application but not further described here.

When the lever 62 is pivoted to disengage its nose from finger 60, and the rotor is thus released, the spring may expand and the expansion of spring 11 will cause the rotor to rotate again, in the same sense as before, in the sense of arrow F. The connection between rotor and the shaft driven thereby for operating the switch mechanism to be actuated by the system, may be of various types. According to whether the shaft to be driven by the rotor is to rotate always in the same sense, as in the case of certain controller cylinders, or is to rotate or turn alternatingly in both senses, the rotor may thus, in the first case, be secured to, or be of one piece with, the actuating shaft or may be positively coupled therewith, or, as in the second case, may be in operative connection with the shaft merely during the energy releasing period.

Figures 3A, 4A:
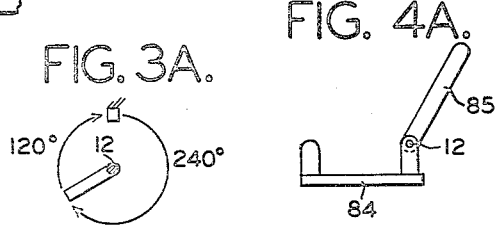
Fig. 3a is a diagram illustrating the operating phases of a rotary switch, actuated by the mechanism illustrated in Fig. 3.
Fig. 4a is a diagram illustrating a circuit breaker in open position to be closed by the mechanism illustrated in Fig. 4.

In the embodiment of Fig. 3, as Fig. 3a diagrammatically illustrates, the shaft 12 of the rotor is to actuate a switch the connecting and disconnecting movements of which are in the same sense. Shaft 12 which is to actuate the switch is rigidly connected with rotor 19 by means of hub 36 and cotter pin 37.

The spring tensioning period, corresponding in the example of Figs. 11 and 12 to an angular deflection of the rotor of 240°, coincides with the opening phase of the switch, Fig. 3a, which switch, by shaft 12, is thus likewise turned about an angle of 240°. The switch in this example is thus opened through the motor drive of the rotor, and subsequently on release of spring 11 by release of the rotor, is closed rapidly through the expansion of the spring.

In the case of switches in which the opening and closing movements of the actuating shaft of the switch are in opposite senses, and the switches are to be actuated by shaft 12, coupling means are provided which, during the phase in which the switch is to be actuated, such as closed, couple the shaft 12 with the rotor during the energy release period of the elastic system and disengage the shaft from the rotor during the energy accumulating period.

Figure 4:
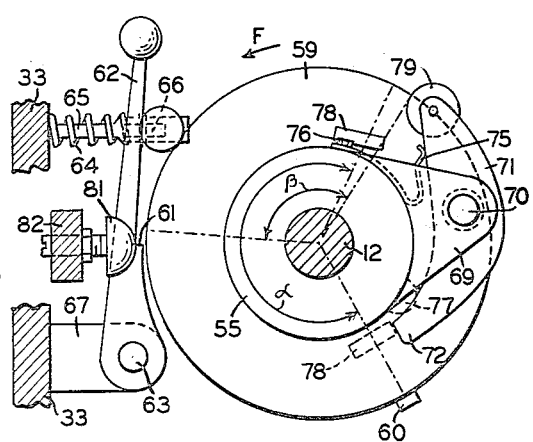
Fig. 4 is a view, partly in section, along line 4—4 of Fig. 2.

Embodiments of this type will now be described with reference to Figs. 2 and 4. In these embodiments, the rotor is loosely rotatable on shaft 12. In the embodiment of Figs. 2 and 4, sleeve 55, secured by pin 56 to shaft 12, carries a crank arm 69 provided with a pin 70 about which a coupling lever 71 may be rocked. The end of one arm of this lever, formed as a nose 72, is urged inwards, towards a deflection limiting stop 77 at the sleeve, by a leaf spring 75 secured at 76 to the sleeve 55 and bearing against the other arm of lever 71. Nose 72 of the one arm of lever 71 will thus be in the rotary path of a coupling finger 78, rigid with and projecting from plate 59 of the rotor at an angular distance α from the finger 60, see Fig. 4, the angle α in this instance being 240° as discussed with reference to Figs. 11 and 12.

The other arm of the coupling lever 71 carries a roller 79, the function of which will be described immediately. When, during the charging period, rotor 19 with its plate 59 rotates, stepwise advanced by the ratchet gear under the pulses of the electromagnet, sleeve 55 remains disengaged, and sleeve 55 and shaft 12 are at rest. When on this rotation, at the termination of the energy accumulating period, finger 60 abuts against nose 61, finger 78 will have reached the position indicated in dashed lines in Fig. 4 and will thus engage the nose 72 of the coupling lever 71. When lever 62 is pivoted by hand, or remote control here not shown, and the rotor is released, the device is also released which holds the elastic system, spring 11, tensioned. Rotor 19, under the action of the expanding spring 11, will continue its rotation, still in the sense of arrow F.

Rotor 19, through the action of finger 78 on coupling lever 72, now takes crank 69, sleeve 55 and shaft 12 along on its rotation. The switching mechanism, e. g. a circuit breaker 84, shown in the open position on Fig. 3 with its blade 85 secured to shaft 12, will be closed while spring 11 expands and the stored energy is released. At the end of this phase, the rotor 19 with shaft 12 thus coupled therewith has completed its course after having described an angular distance β, in this instance of 120°, again in accordance with the cam arrangement of Figs. 11 and 12. At this moment, the termination of the energy releasing period, when the actuation or closing operation of switch mechanism has been completed, roller 79 will strike a stationary stop 81 mounted at a bracket 82 of the framework 33.

Coupling lever 71 thus is rocked out of engagement of its nose 72 with coupling finger 78, and rotor 19 and shaft 12 are disengaged. With a subsequent return movement of shaft 12 and the opening of the switch mechanism connected to the shaft, sleeve 55 and crank and lever system 69, 70, 71 will be returned freely into the rest position of Fig. 4.

At the moment when the closing operation of the switch mechanism has been completed and the accumulated energy has been fully released, or, rather, after a certain supplemental course, the rollers 46, 47 have again arrived between the deepest points or minima, D, D' and C, C', of the cam profiles, Fig. 11. If the operation takes place with an excess of energy, the angular velocity at the end of the closing period of the switch mechanism is not zero and, under the effect of the kinetic energy accumulated in the rotating parts, the rollers 46, 47 will ascend a part of the succeeding energy accumulating cam rise, DB, D'B' and CA, C'A' thus causing a partial tensioning of the spring 11. The holding pawl 29, Fig. 1, will prevent any return movement.

The invention has been illustrated with reference to the actuation of a circuit breaker. It may as well be employed for the actuation of any other appropriate mechanism such as starters for motors, rotating machines, and the like.

I claim:

1. Accumulator for mechanical energy, particularly for the actuation of circuit breakers, starters and controllers for motors and other rotary apparatus and the like, including an energy storing and releasing elastic system disposed for compression and expansion by translational motion along a longitudinal axis thereof, mechanism being associated with said elastic system for supplying mechanical energy thereto to be stored therein and for receiving mechanical energy to be released therefrom, said mechanism including a rotor, a shaft carrying the same, said elastic system and said rotor being disposed relatively to each other so as for the geometric axis of rotation of said rotor to coincide with said longitudinal axis of the elastic system, said mechanism further including transmission and motion converting gear operatively connecting said rotor to said elastic system thereby to transmit said mechanical energy between both and converting translational motion of the elastic system into rotary motion of said rotor and conversely.

2. Accumulator for mechanical energy, particularly for the actuation of circuit breakers, starters and controllers for motors and other rotary apparatus and the like, including an energy storing and releasing elastic system disposed for compression and expansion by translational motion along a longitudinal axis thereof, a rotor associated with said elastic system for energy exchange therewith and disposed relatively thereto so as for the geometric axis of rotation of said rotor to coincide with said longitudinal axis of the elastic system; a motor drive being operatively connected with said rotor for supplying rotational energy thereto and driven mechanism for withdrawing rotational energy therefrom in the same sense of rotation.

3. Accumulator for mechanical energy particularly for the actuation of circuit breakers, starters and controllers for motors and other rotary apparatus and the like, including an energy storing and releasing elastic system disposed and arranged for compression and expansion by translational motion along a longitudinal axis thereof, a rotor, a shaft carrying the same, both disposed relatively to said elastic system so as for the geometric axis of rotation of the rotor to coincide with said longitudinal axis, a unidirectional drive for driving said rotor and thereby supplying rotational energy thereto, motion transmitting and converting gear operatively connected with said elastic system and said rotor for converting rotational motion of said rotor into translational motion of the elastic system for compressing the same and storing mechanical energy therein, and, conversely, converting, at the release of the stored energy, translational motion of the elastic system into rotational motion of the rotor, both rotational motions in the same sense of rotation.

4. Accumulator for mechanical energy, particularly for the actuation of circuit breakers, starters and controllers for motors and other rotary apparatus and the like, including an energy storing and releasing elastic system disposed and arranged for compression and expansion by translational motion along a longitudinal axis thereof, a rotor, a shaft carrying the same, said rotor being disposed relatively to said elastic system so as for its geometric axis of rotation to coincide with the axis of translational motion of the elastic system; a unidirectional drive for driving said rotor and thereby supplying rotational energy thereto and driven mechanism associated with said rotor, for supplying thereto from said rotor the energy released from the elastic system; motion transmitting and converting gear including a slide member being disposed axially displaceable but not rotatable upon said shaft and operatively connected with said elastic system, said gear including motion converting members disposed between said rotor and said slide member for converting rotational motion of said rotor into translational motion of the elastic system for compressing the same and storing mechanical energy therein, and, conversely, for converting, at the release of the stored energy, translational motion of the elastic system, at the expansion thereof, into rotational motion of the rotor, both rotational motions in the same sense of rotation.

5. Accumulator as set forth in claim 4 wherein said motion converting members comprise a pair of circular cams disposed, in opposition to each other, upon said shaft, one cam rigidly connected to said rotor, the other to said slide member, at least one cam roller being associated with said pair of cams and disposed for rolling between said pair while revolving about said axis; the profiles of said cams being each generated through movement of a rectilinear generatrix intersecting perpendicularly said axis and moved along a circular directrix undulating in the direction of said axis as a curve between a maximum and a minimum, thereby, when the rotor is driven by means of said drive for charging the elastic system, to cause said roller to ascend the rise from said minimum to said maximum and thus to displace said slide member for compressing the elastic system and, on release of the stored energy, through the expansion of the elastic system, to displace the slide member in the reverse direction, cause the roller to descend the fall from the maximum to the minimum, and cause the rotor to rotate in the same direction as before for delivery of the released energy to mechanism actuated thereby.

6. Accumulator as set forth in claim 5 wherein both cam surfaces, when the body carrying the one is imagined to be turned over so that both cam surfaces face the same direction, are identical.

7. Accumulator as set forth in claim 5 wherein both cam surfaces, when the body carrying the one is imagined to be turned 180° about the axis of the roller, coincide in any position of the roller, so as, for both cam surfaces, in any working position of the bodies carrying the same, to contact the roller tangentially and diametrally of the roller circumference, with the tangential length elements of the cam surfaces parallel to each other.

8. Accumulator as set forth in claim 5 wherein a plurality of cam rollers is provided and the curve of the directrix is undulating between a corresponding number of maxima and minima distributed around the circumference of said curve.

9. Accumulator as set forth in claim 5 wherein the shaft carrying said rotor is provided with a sleeve disposed between said rotor and said slide member, said sleeve being slidable and rotatable upon said shaft and being provided with a stub axle, radially extended therefrom for carrying rotatably thereupon said roller.

10. Accumulator as set forth in claim 5 wherein said shaft, carrying the rotor, is rigidly joined to said rotor.

11. Accumulator as set forth in claim 5 wherein said shaft, carrying the rotor, also carries, slidable relatively thereto, said elastic system and said slidable member.

12. Accumulator as set forth in claim 5 wherein said rotor is provided with a stop member, a releasable abutment member being associated with said stop member, both disposed in spatial relationship to each other for the abutment member to engage the stop member and stop rotation of the rotor when, on supplying energy to said elastic system, the accumulated energy has reached its maximum value, and, on release of the stop member and disengagement of both, to release said rotor for rotation under the urging of the expanding elastic system and for transmission of the released energy to mechanism associated therewith and actuated thereby.

13. Accumulator as set forth in claim 5 wherein a releasable coupling is provided between the rotor and the shaft carrying the same, said coupling comprising a coupling lever pivotally disposed upon one of said rotor and shaft to be rocked thereupon, said coupling lever being provided with a nose, the other one of said elements being provided with a coupling finger rigid therewith, said nose and said coupling finger being disposed upon said elements and relatively to each other so as to engage each other and couple said elements when the rotor has rotated to the extent that the accumulated energy has reached its maximum value and the elastic system its greatest compression, means being provided for rocking said coupling lever out of engagement of its nose with said coupling finger when, on release of the stored energy, the rotor has completed its rotary path.

14. Accumulator as set forth in claim 13 wherein a stationary abutment is associated with said coupling lever for rocking it out of the engagement of its nose with said coupling finger when, on release of the stored energy, the rotor has completed its rotary path.

No references cited.